(12) United States Patent
Deshpande et al.

(10) Patent No.: US 10,689,021 B2
(45) Date of Patent: Jun. 23, 2020

(54) AUTOMATIC LOAD MOVER

(71) Applicants: Anup S. Deshpande, Troy, MI (US); Manini G. Deshpande, Troy, MI (US); Akshay S. Deshpande, Maharashtra (IN)

(72) Inventors: Anup S. Deshpande, Troy, MI (US); Manini G. Deshpande, Troy, MI (US); Akshay S. Deshpande, Maharashtra (IN)

( * ) Notice: Subject to any disclaimer, the term of this patent is extended or adjusted under 35 U.S.C. 154(b) by 124 days.

(21) Appl. No.: 15/684,114

(22) Filed: Aug. 23, 2017

(65) Prior Publication Data

US 2018/0057034 A1    Mar. 1, 2018

Related U.S. Application Data

(60) Provisional application No. 62/380,390, filed on Aug. 27, 2016.

(51) Int. Cl.
| | |
|---|---|
| *G05D 1/02* | (2020.01) |
| *B62B 5/00* | (2006.01) |
| *G05D 1/00* | (2006.01) |

(52) U.S. Cl.
CPC ........... *B62B 5/002* (2013.01); *G05D 1/0016* (2013.01); *G05D 1/024* (2013.01); *G05D 1/0246* (2013.01); *B62B 5/0069* (2013.01); *B62B 5/0076* (2013.01); *B62B 5/0079* (2013.01); *G05D 1/0223* (2013.01); *G05D 1/0255* (2013.01); *G05D 2201/0216* (2013.01)

(58) Field of Classification Search
CPC ........................... B62B 5/0069; B62B 5/0076
See application file for complete search history.

(56) References Cited

U.S. PATENT DOCUMENTS

| | | | | |
|---|---|---|---|---|
| 8,684,373 | B2 * | 4/2014 | Holtan | B62B 3/1404 |
| | | | | 280/33.991 |
| 9,643,638 | B1 * | 5/2017 | Wittliff, III | B62B 5/0076 |
| 9,896,315 | B2 * | 2/2018 | High | E01H 5/12 |
| 10,017,201 | B2 * | 7/2018 | Cardano | B62B 5/0069 |
| 2005/0216126 | A1 * | 9/2005 | Koselka | B25J 5/007 |
| | | | | 700/259 |
| 2006/0106496 | A1 * | 5/2006 | Okamoto | G05D 1/0272 |
| | | | | 700/253 |
| 2010/0241290 | A1 * | 9/2010 | Doane | G05D 1/028 |
| | | | | 701/2 |
| 2011/0010024 | A1 * | 1/2011 | Salisbury | G06F 3/014 |
| | | | | 701/2 |
| 2012/0163671 | A1 * | 6/2012 | Choi | G06K 9/00805 |
| | | | | 382/104 |
| 2014/0107868 | A1 * | 4/2014 | DiGiacomcantonio | A45C 5/14 |
| | | | | 701/2 |
| 2015/0229906 | A1 * | 8/2015 | Inacio De Matos | |
| | | | | G05D 1/0246 |
| | | | | 348/46 |
| 2016/0059875 | A1 * | 3/2016 | Segman | B62B 5/0063 |
| | | | | 701/24 |

(Continued)

*Primary Examiner* — Peter D Nolan

(57) ABSTRACT

A device is disclosed for controlling a vehicle. The method includes monitoring received input from one or more proximity sensor, approximating a user's lateral and longitudinal positions behind the vehicle based upon the monitoring, and controlling the vehicle based upon the approximate lateral and longitudinal positions of the user with respect to the vehicle to continuously re-center the vehicle with respect to the user.

20 Claims, 19 Drawing Sheets

(56) References Cited

U.S. PATENT DOCUMENTS

| | | | |
|---|---|---|---|
| 2016/0101803 A1* | 4/2016 | Ahlemeier | B62B 9/08 |
| | | | 180/167 |
| 2017/0003682 A1* | 1/2017 | Segman | G05D 1/0295 |
| 2017/0050659 A1* | 2/2017 | Cardano | B62B 5/0069 |
| 2017/0108860 A1* | 4/2017 | Doane | G05D 1/0212 |
| 2019/0179329 A1* | 6/2019 | Keivan | G05D 1/0214 |
| 2019/0235493 A1* | 8/2019 | Doane | B60W 30/08 |

* cited by examiner

| User detected in | Continuous detection time (t) | Left Motor Direction | Right Motor Direction | Resulting Device Motion |
|---|---|---|---|---|
| Both zones | N/A | Forward | Forward | No turn |
| Left zone | t < T1 | Forward | Slow Forward | Slow right turn |
| Left zone | t > T1 | Forward | Reverse | Rapid right turn |
| Right zone | t < T1 | Slow Forward | Forward | Slow left turn |
| Right zone | t > T1 | Reverse | Forward | Rapid left turn |
| No zone | N/A | Stop | Stop | No motion |

FIG. 8

AUTOMATIC LOAD MOVER

CROSS REFERENCE TO RELATED APPLICATIONS

This application claims the benefit of U.S. Provisional Patent Application No. 62/380,390, filed Aug. 27, 2017, the disclosure of which is incorporated herein by reference.

TECHNICAL FIELD

This disclosure relates to load assistive devices, and more particularly to hands-free vehicular devices and methods for moving loads.

BACKGROUND

The statements in this section merely provide background information related to the present disclosure and may not constitute prior art.

Many aspects of our modern life are made easier and comfortable with the help of technology, but there are still many activities and chores which are done manually, requiring physical excursion. For example: Pushing shopping carts, strollers, trolleys or moving any other types of load on wheels. This becomes a challenge especially for people with disabilities, handicapped people, elderly people, pregnant women or women carrying children, etc. Therefore, a need exists for a device configured for hands-free operation to assist a user in moving a load.

SUMMARY

A device is disclosed for controlling a vehicle. The method includes monitoring received input from one or more proximity sensor, approximating a user's lateral and longitudinal positions behind the vehicle based upon the monitoring, and controlling the vehicle based upon the approximate lateral and longitudinal positions of the user with respect to the vehicle to continuously re-center the vehicle with respect to the user.

Certain embodiments include a device is disclosed for automatically moving a vehicle or load based upon a human-user's hands-free movement or a moveable object designated by the user. Methods for operating the device are disclosed. The method includes establishing a first zone associated with a first sensor, establishing a second zone associated with a second sensor, wherein the first zone and the second zone overlap, in part, monitoring a user's position with the first and second sensor, and controlling the vehicle based upon the monitored user's position with respect to the first and second zones.

Certain embodiments of the methods may include: executing a right turn with the vehicle when the user is monitored within the first zone and the user is not monitored within the second zone, executing a left turn with the vehicle when the user is not monitored within the first zone and the user is monitored within the second zone, executing forward movement with the vehicle when the user is monitored within the first zone and the user is monitored within the second zone; or stopping the vehicle when the user is not monitored within the first zone and the user is not monitored within the second zone.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which:

FIGS. 3B and 3C shows an exemplary detection zone, in accordance with the present disclosure;

FIG. 8 shows a table of exemplary control rules, in accordance with the present disclosure;

DETAILED DESCRIPTION

Figure 1:
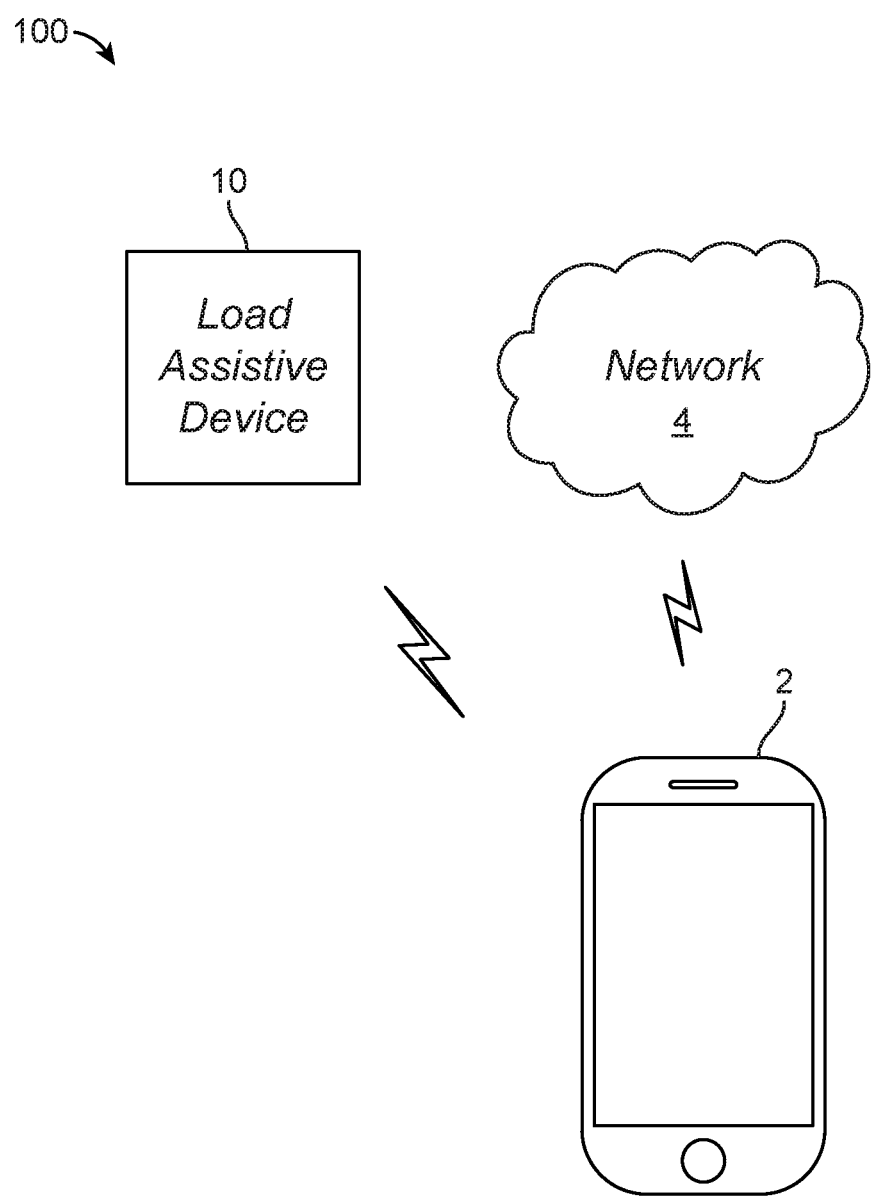
FIG. 1 schematically shows an exemplary automated load mover system, in accordance with the present disclosure.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based upon" is not exclusive and allows for being based on additional factors not described, unless the context clearly dictates otherwise.

Referring now to the drawings, wherein the depictions are for the purpose of illustrating certain exemplary embodiments only and not for the purpose of limiting the same, FIG. 1 schematically shows an exemplary system 100 that may help implement the methodologies of the present disclosure. The system 100 includes an automatic load moving device 10, a network 4, and a mobile device 2. As shown in FIG. 1, the device 10 may be indirectly communicatively connected to the mobile device 2 via the network 4 and/or directly communicatively connected to the mobile device 2. The mobile device 2 may be physically connected to the network 4 or the device 10 during selected periods of operation without departing from the teachings herein. Components of the system 100 are shown in FIG. 1 as single elements. Such illustration is for ease of description and it should be recognized that the system 100 may include multiple additional mobile and computing devices or none at all and that the system 100 may function with or without the network 4 depending on the particular embodiment.

The network 4 may be any suitable series of points or nodes interconnected by communication paths. The network 4 may be interconnected with other networks and contain sub networks network such as, for example, a publicly accessible distributed network like the Internet or other networks e.g., intranets, virtual nets, overlay networks and the like. The network 4 may facilitate the exchange of data between and among the mobile device 2 and the load moving device 10 although in various embodiments the mobile device 2 may be directly connected to the load moving device 10.

The mobile device 2 may be: various embodiments of a computer including high-speed microcomputers, minicomputers, mainframes, wearable exercise device, and/or data storage devices. The mobile device 2 may be configured to execute database functions including storing and maintaining a database and processes requests from the load moving device 10 to extract data from, or update, a database as described herein below. The mobile device 2 may additionally provide processing functions for the load moving device 10 as will become apparent to those skilled in the art upon a careful reading of the teachings herein. In one embodiment, the mobile device 10 is not mobile and is configured as a conventional server housing.

In addition, the mobile device 2 may include one or more applications that the user may operate. Operation may include downloading, installing, turning on, unlocking, activating, or otherwise using an application. The application may comprise at least one of an algorithm, software, computer code, and/or the like, for example, mobile application software. In the alternative, the application may be a website accessible through the world wide web.

Figure 2:
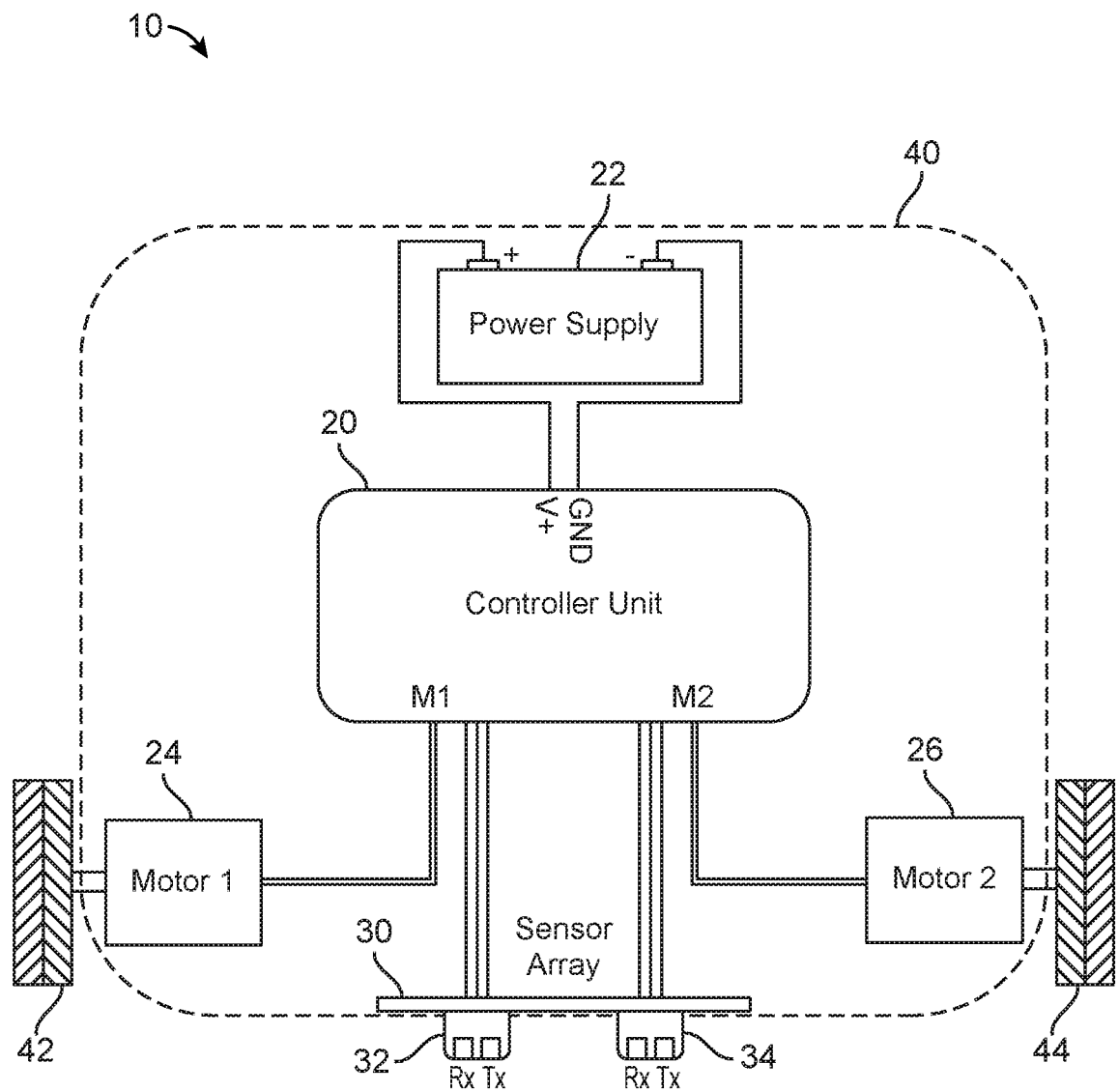
FIG. 2 schematically shows a load moving device, in accordance with the present disclosure.

FIG. 2 schematically shows the load moving device 10. As FIG. 2 shows, the device 10 includes a controller unit 20, a power supply 22, a first motor 24, a second motor 26, and a sensor array 30 that includes a first sensor 32 and a second sensor 34. The sensors 32 and 34 may be proximity sensors, in one embodiment. In various alternative embodiments, the sensors 32 and 34 may be photosensors sensors, charge-coupled based device, or other electromagnetic sensors configured to detect presence or movement of a person-user 6 such as using one or more lasers or infrared devices. In one embodiment, the sensor 32 and 34 may be acoustic-based sensors, i.e., ultrasonic sensors, configured to detect movement based upon reflected sound waves.

In one embodiment, the device 10 includes a cart 40 and a first and second wheel 42 and 44, although one skilled in the art, upon a careful reading of the teachings herein, will recognize that the disclosure may apply to embodiments having a single motor, or multiple additional motors, or no cart, or different load moving structure or various wheel quantity and wheel configurations. One skilled in the art will recognize that the device 10 may be connected to various load bearing structures including, e.g., strollers, trolleys, etc.

The controller unit 20 is preferably a general-purpose microprocessor or central processing unit and has a set of control algorithms, comprising resident program instructions and calibrations stored in the memory and executed to provide the desired functions. As one skilled in the art will recognize, the controller unit 20 executes functions in accordance with any one of a number of operating systems including proprietary and open source system solutions. In one embodiment, an application program interface (API) is preferably executed by the operating system for computer applications to make requests of the operating system or other computer applications. The description of the controller unit 20 is meant to be illustrative, and not restrictive to the disclosure, and those skilled in the art will appreciate that the disclosure may also be implemented on platforms and operating systems other than those mentioned.

In various embodiments, the controller unit 20 may include a storage device. The storage device may be any disk based or solid state memory device for storing data including a non-transitory computer readable medium configured to store instructions translatable by the controller unit 20. In one embodiment, the controller unit 20 is configured to operate a display device. The controller unit 20 includes an interface controller to communicate with an Input/Output controller in one embodiment that is configured to determine user inputs via one or more Input/Output devices such as a keyboard, a mouse, and/or a microphone. In one embodiment, the sensor array 30 including the first and second sensors 32 and 34 are communicatively connected via the Input/Output controller.

The controller unit 20 preferably includes one or more communications interface adapters for communicating with external or remote devices such as the mobile device 2. The communications interface adapters may be any known device adapted for wireless or wired communication and preferably configured for receiving and sending information communicated via one or more antennas.

The power supply 22 may be any known electrical energy storage device such as a battery, or any known electrical energy generative device such as solar panels. Preferably, the power supply 22 is electrically connectable to a standard 110-volt AC receptacle and configured to electrically communicate electrical energy preferably through a transformer for use or storage thereon.

The motors 24 and 26 are preferably electric motors configured to drive an axle connected to one or more wheels such as the wheels 42 and 44. The motors 24 and 26 may be configured to drive the axle directly or through a transmission mechanism to rotate. The motors 24 and 26 are preferably a direct-current motor. In various embodiments, one or more of the motors 24 and 26 may be a stepper motor. The motors 24 and 26 receive power from the power supply 22 that is mounted within the frame assembly of the device 10 and which power is supplied through the controller 20.

In exemplary operation, an amount of electrical power supplied from the power supply 22 through the controller 20 to the motors 24 and 26 is controlled in response to certain inputs including, e.g., a torque signals from a brake input and/or an accelerator/throttle input, however it is contemplated herein that the torque signals may be derived based, in part, upon sensor input as described herein below. In various embodiments, a speed sensor may also be used and connected to the controller 20 for providing a speed signal to the controller 20. In one embodiment, the controller 20 may include a speed governor configured to limit a maximum speed and/or torque input.

Figure 3A:
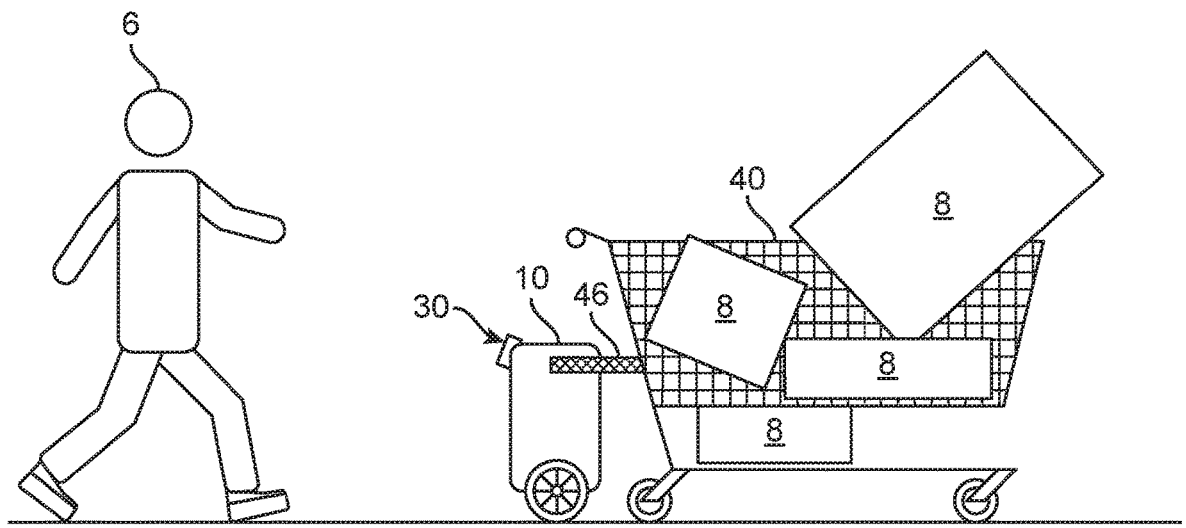
FIGS. 3A-3C show an exemplary adaptation of the device to a cart for use with a user, in accordance with the present disclosure.
Figure 3B:
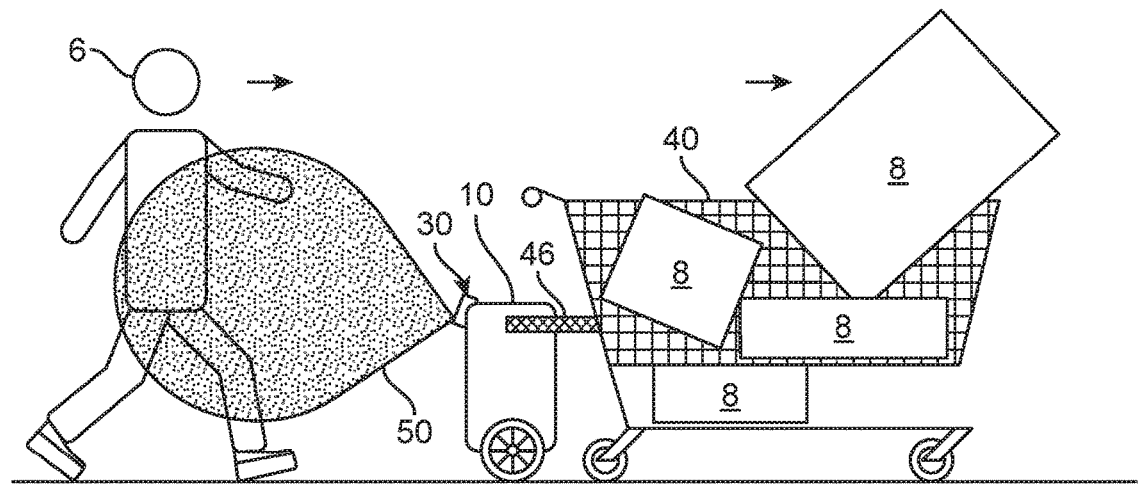
Figure 3C:
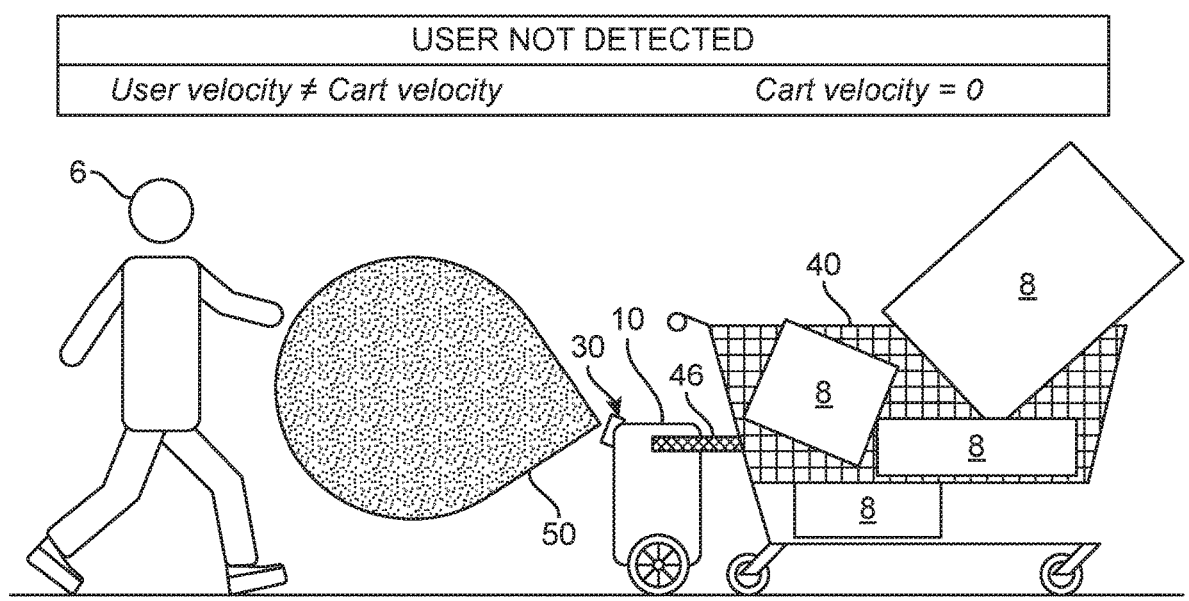

FIGS. 3A-3C show an exemplary adaptation of the device 10 to a cart 40 for use with a user 6 to move a plurality of exemplary load elements 8. As FIGS. 3A-3C show, the device 10 may be fitted with a mechanical attachment 46 configured to physically connect the device 10 to a cart 40. The attachment 46 may be selectively attachable so that a user 6 can detach or attach as desired. The attachment 46 may be a strap or latch in various embodiments.

FIGS. 3B and 3C shows an exemplary detection zone 50. As FIG. 3B illustrates, the sensors 30 have a finite zone 50 from which to detect and monitor a person 6 and a person's movement. In operation, when the person 6 is within the zone 50, the device 10 may infer forward movement. As shown in FIG. 3C when the person is outside of the zone 50, the device 10 may be configured to slow or stop forward movement.

Figure 4:
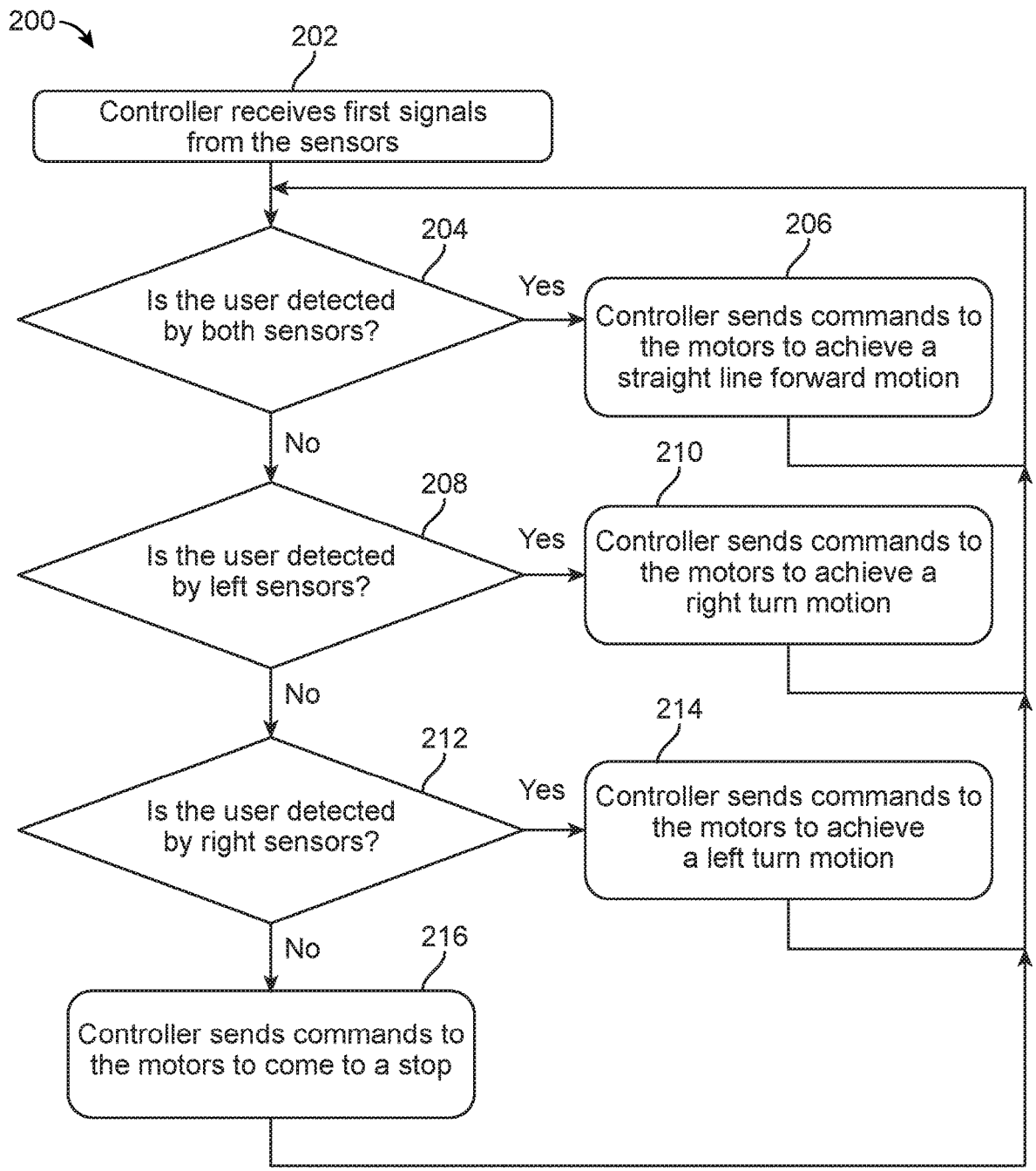
FIG. 4 shows an exemplary process for controlling the device, in accordance with the present disclosure.
Figure 5A:
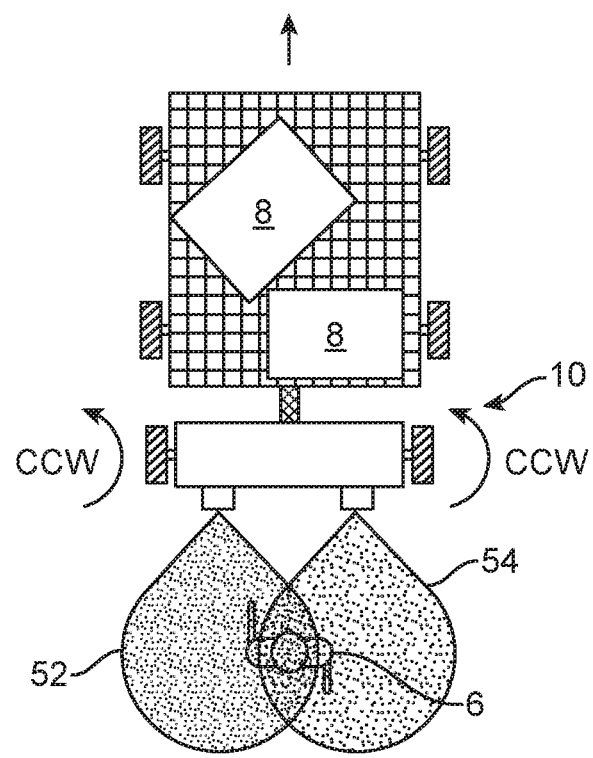
FIGS. 5A-5C illustrate responsiveness of the device based upon user movement, in accordance with the present disclosure.
Figure 5B:
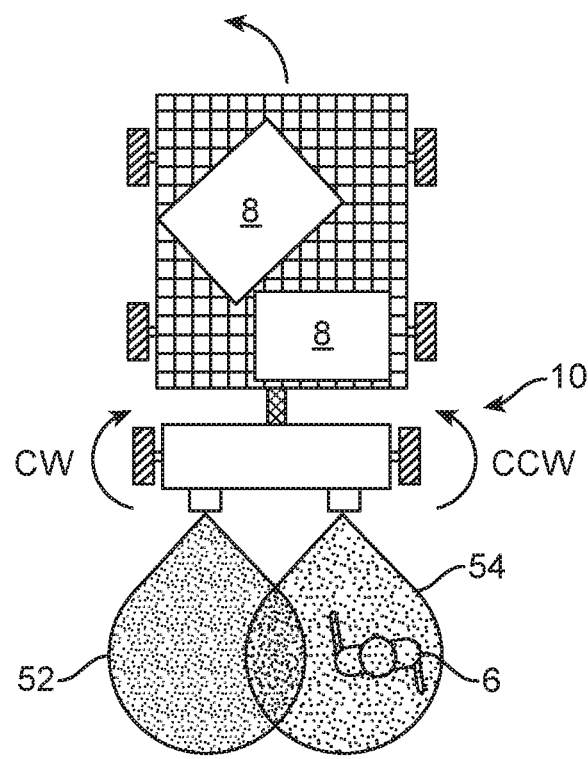
Figure 5C:
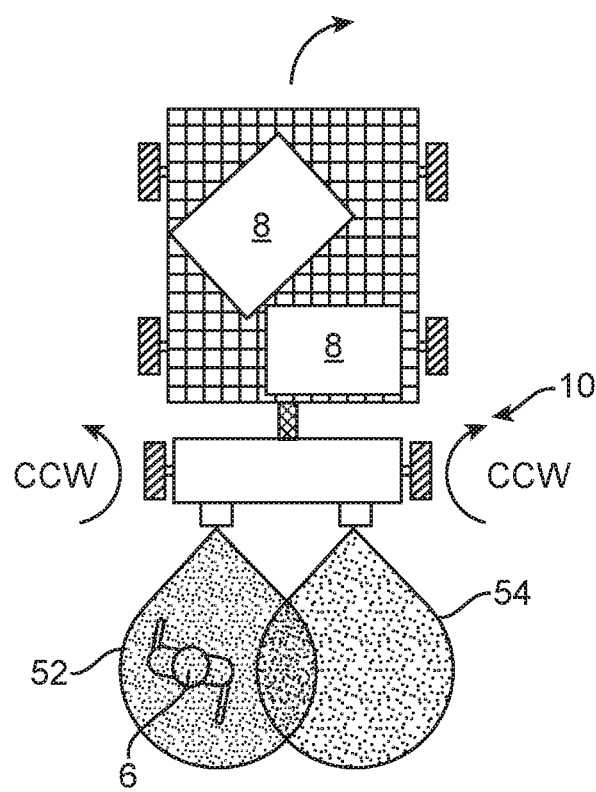

FIG. 4 shows an exemplary process 200 for controlling the device 10. As FIG. 4 shows, the process 200 is initiated at step 202 when the controller 20 receives a first set of signals from the sensors 32 and 34. If the person 6 is detected by both the first and second sensors 32 and 34 at step 204, then the controller 20 send a command to the motors to execute forward movement at step 206 such as illustrated in exemplary FIG. 5A. Although FIGS. 5A-5C show a user being detected within the sensor zones, one will recognize that further objects may be designated to detect. For example, a user pushing a stroller may designate the stroller as the detection object, whereby the device 10 is controlled based upon movement of the stroller.

If the person 6 is not detected by both the first and second sensors 32 and 34 at step 204, then the controller 20 inquires whether the person 6 was detected only by a first sensor at step 208. If so, then the controller 20 transmits instructions to execute a right turn movement at step 210 and illustrated in exemplary FIG. 5C. In one embodiment, if the person is detected by only right sensor 34 for a defined minimum time TR, the device 10 will interpret this as a request for left turn and the two motors will have a differential motion, i.e., one clockwise the other counterclockwise resulting in a turn towards left. The amount of the steering may be proportional to the amount of time for which user is detected by only right sensor 34. Depending on the amount of steering desired, the user can remain towards right or be at center while walking behind the cart 40.

If not, then the controller 20 inquires whether the person 6 was detected only by a second sensor at step 212. If so, then the controller 20 transmits instructions to execute a left turn movement at step 214 and illustrated in exemplary FIG. 5B. In one embodiment, if the person 6 is detected by only the second sensor (e.g., the left sensor 32) for minimum time TL, the device 10 will interpret this as a request for right turn and the two motors will have a differential motion, i.e., one clockwise the other counterclockwise resulting in a turn towards right. The amount of steering may be proportional to the amount of time for which user is detected by only left sensor 32. Depending on the amount of steering desired, the person 6 can move towards left or be at the center while walking behind the cart/load.

While FIGS. 5B and 5C and steps 208-214 envision turning the device 10 in an opposite position from where the user is detected, e.g., left sensor detection results in a right turn, the device 10 may be configured in an opposite manner. For example, the device 10 may be configured so that detection of the user by only or predominately the left sensor 32 results in a left turn and detection of the user by only or predominately the right sensor 34 results in a right turn.

If the person was not detected by either the first or second sensors in step 208 or step 212, then the controller 20 transmits instructions for the device 10 to stop or slow down 216.

In one embodiment, a distance from the device 10 may be utilized to translate into a speed. For example, if the person is closer to the device 10, the controller may be configured to move the device 10 at a higher speed than if the person 6 is further away.

In one embodiment, a threshold distance may be established whereby the device 10 is activated for forward movement when a person is less than a first threshold distance proximate to the device 10.

In one embodiment, the device 10 may be configured to maintain a predefined distance from the person 6 based upon input from the sensors 30.

In one embodiment, the device 10 is configured to stop or transition to a stand-by operating state by toggling a switch or other direct transmitted command. In one embodiment, the device 10 is configured to stop upon detecting that the person 6 has manually begun moving the cart 40 such as via a second threshold detector. For example, if the person is within a predefined distance to the device 10, then the device 10 may transition to an OFF operating state, wherein the second threshold is closer than the first threshold distance.

Although the process 200 is shown as discrete elements, such an illustration is for ease of description and it should be recognized that the functions performed by the process 200 may be combined in one or more devices, e.g., implemented in software, hardware, and/or application-specific integrated circuitry (ASIC).

Further, although FIG. 4 may show a specific order of method steps, the order of the steps may differ from what is depicted. Unless specifically stated, the methods or steps shown in the flowcharts and described in the accompanying text are not constrained to a particular order or sequence. In various embodiments, some of the steps thereof can occur or be performed concurrently or with partial concurrence and not all the steps have to be performed in a given implementation depending on the requirements of such implementation. For example, monitoring and receiving input from the sensors 32 and 34 of the various sensors may be executed concurrently in steps 208 and 212. Further, the order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure. All such variations are within the scope of the disclosure.

Figure 5D:
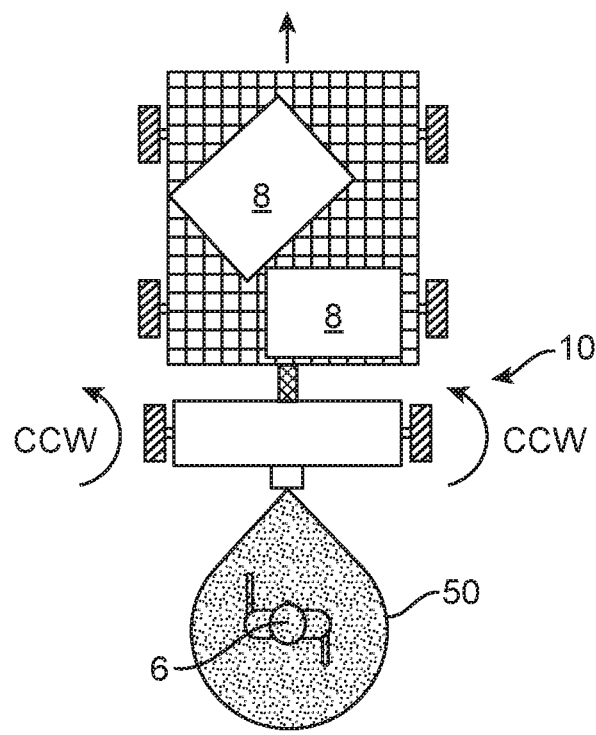
FIGS. 5D-5F illustrate responsiveness of an embodiment of the device having a single sensor based upon user movement, in accordance with the present disclosure.
Figure 5E:
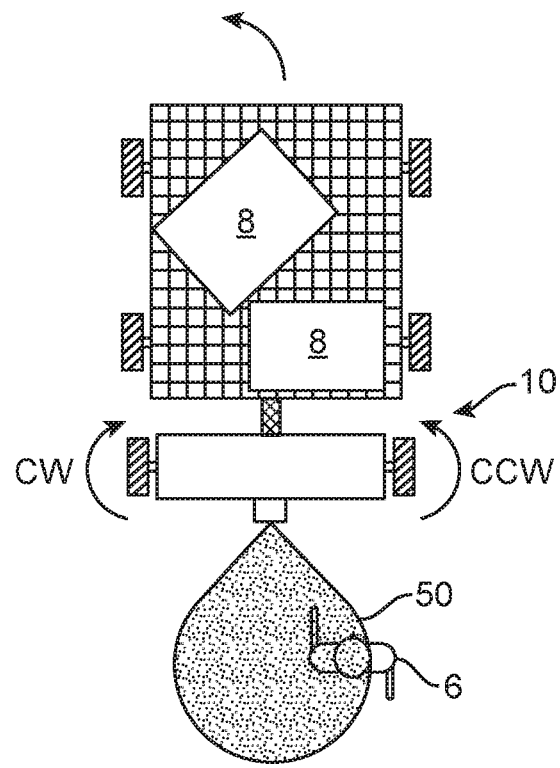
Figure 5F:
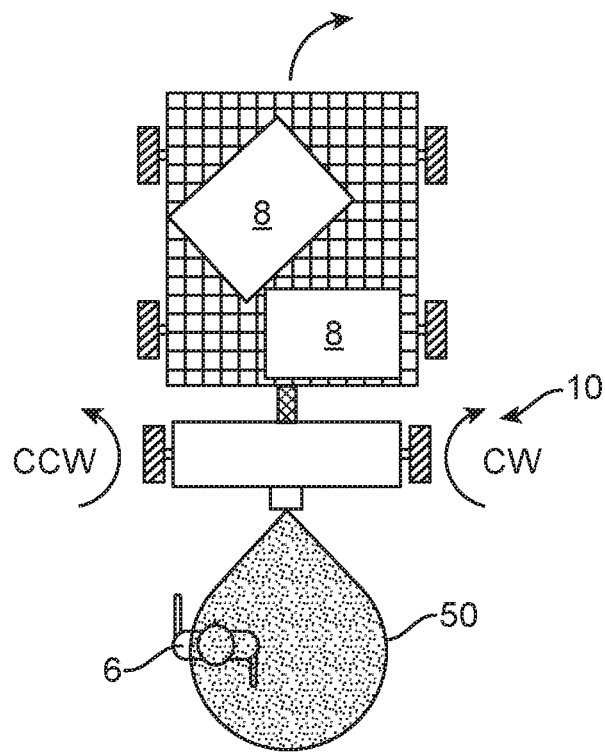

FIGS. 5D-5F illustrate responsiveness of an embodiment of the device having a single sensor based upon user movement. As FIGS. 5D-5F show, the device 10 may be controlled based upon position of the user with respect to a zone of detection of a single sensor. In one embodiment, the device 10 is configured to move forward when the user is detected within a central area of the zone as illustrated in FIG. 5D. In one embodiment, the device 10 is configured to turn left when the user is detected within a right side of the zone as illustrated in FIG. 5E. In one embodiment, the device 10 is configured to turn right when the user is detected within a left side of the zone as illustrated in FIG. 5F.

In one embodiment, relative lateral position of the user with respect to a center of the device 10 is estimated and one or more of the motors 24 and 26 are turned in a way to produce proportional steering effect for the device 10. For example, if the user is detected in both left and right zones, both left and right motors turn in forward direction at preset speed (Sp). If the user is detected in left zone only for amount of time less than threshold T1, then left and right motors turn in forward direction but the left motor is turning faster than right motor, thereby slowly steering the device towards right. If the user is detected in left zone only for amount of time greater than threshold T1, then left motor turns in forward direction and right motors turn in reverse direction thereby rapidly steering the device towards right. If the user is detected in right zone only for amount of time less than threshold T1, then left and right motors turn in forward direction but the right motor is turning faster than left motor, thereby slowly steering the device towards left. If the user is detected in right zone only for amount of time greater than threshold T1, then right motor turns in forward direction and left motors turn in reverse direction thereby rapidly steering the device towards left. See FIG. 8 for an exemplary table indexing exemplary operations of the device 10.

In some embodiments, the sensors 32 and 34 will not have discrete operation, but a quantifiable signal strength correlatable to the user's position with the zone associated with the sensor. For example, a user firmly in a central position of a sensor's zone will result in a high signal strength, while a user bordering on a perimeter will result in a low signal strength. In various embodiments, a speed and direction of the motors 24 and 26 may be a function of the received signal strength. For example, one motor operation may be associated with signal strength from one of the sensors whereby a strong signal from the sensor results in faster motor operation while a weaker signal from the sensor results in slower operation.

Figure 6A:
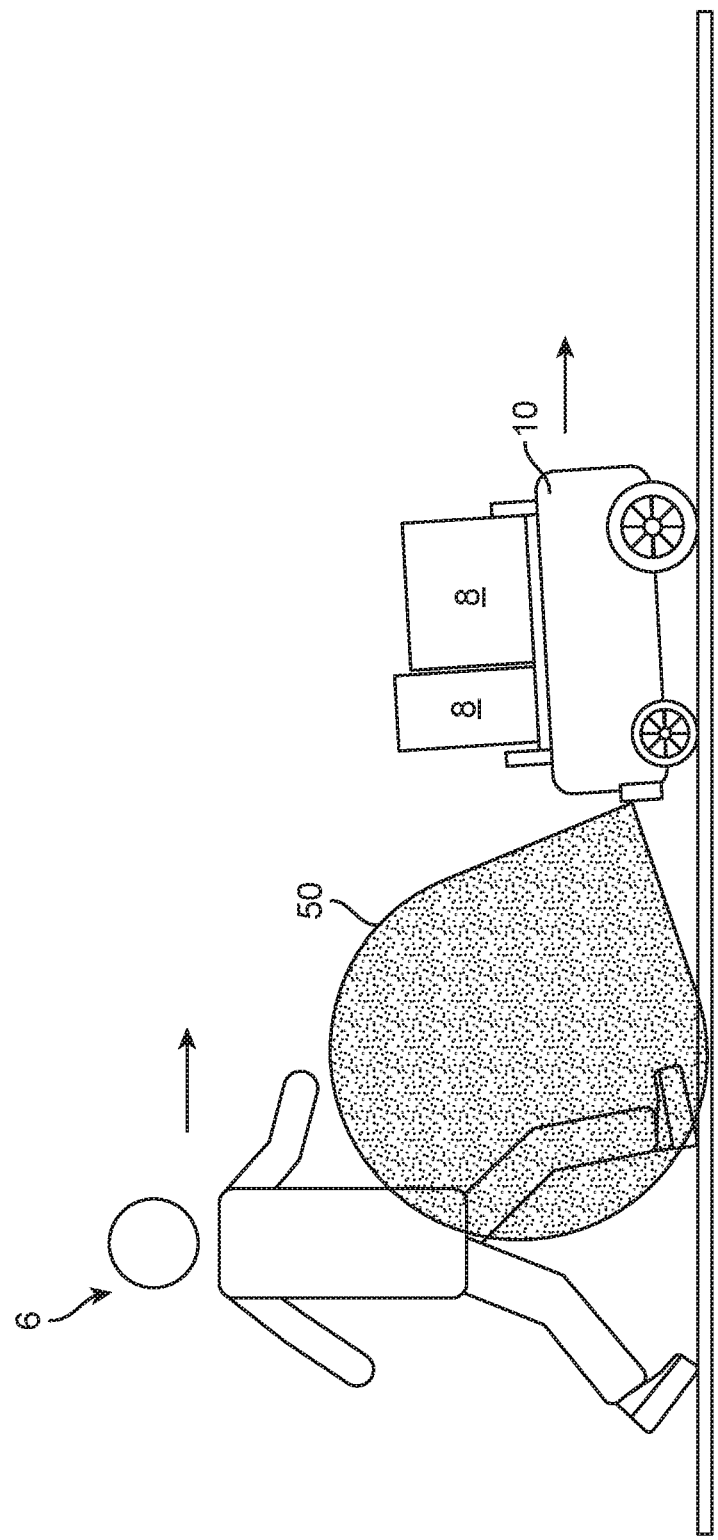
FIGS. 6A-6C show embodiments of the device, in accordance with the present disclosure.
Figure 6B:
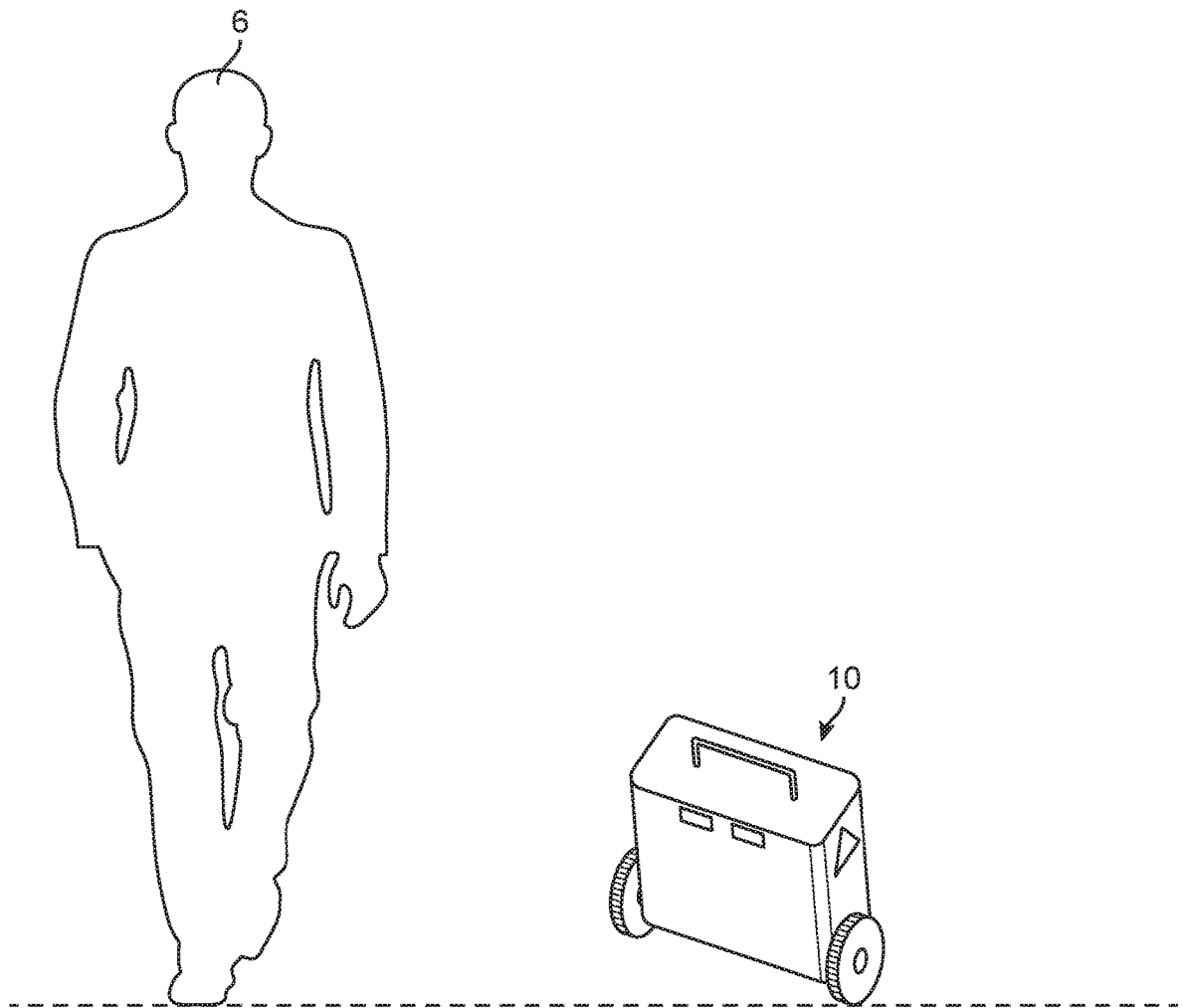
Figure 6C:
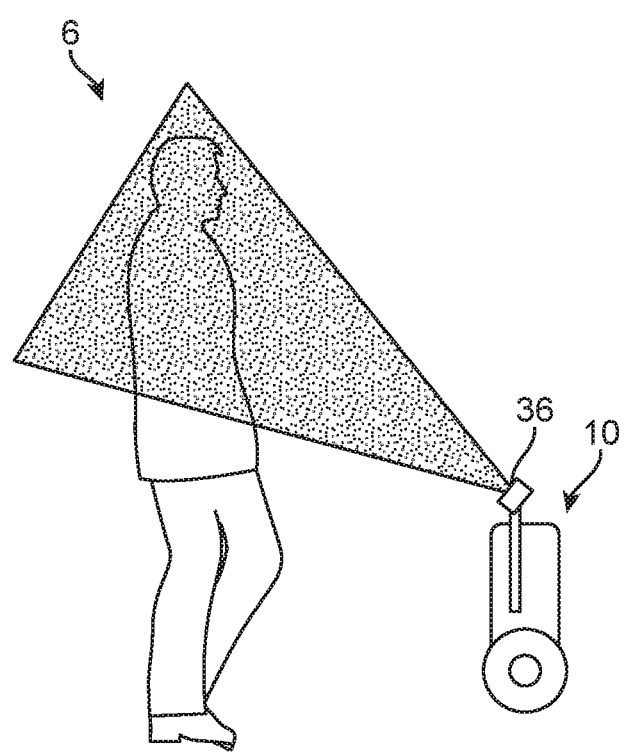

FIGS. 6A and 6B show embodiments of the device 10. As FIG. 6A shows, the device 10 may lack the mechanical attachment 46 and may be formed integral with a cart-based container. In another embodiment, the device 10 will have a single sensor. If the sensor detects user, the device 10 will move forward and if sensor doesn't detect the user, it will come to a stop. FIG. 6B shows an embodiment of the device 10 having a handle for easy transport when not engaged with a load-supporting cart such as shown in FIGS. 3A-3C.

Figure 7C:
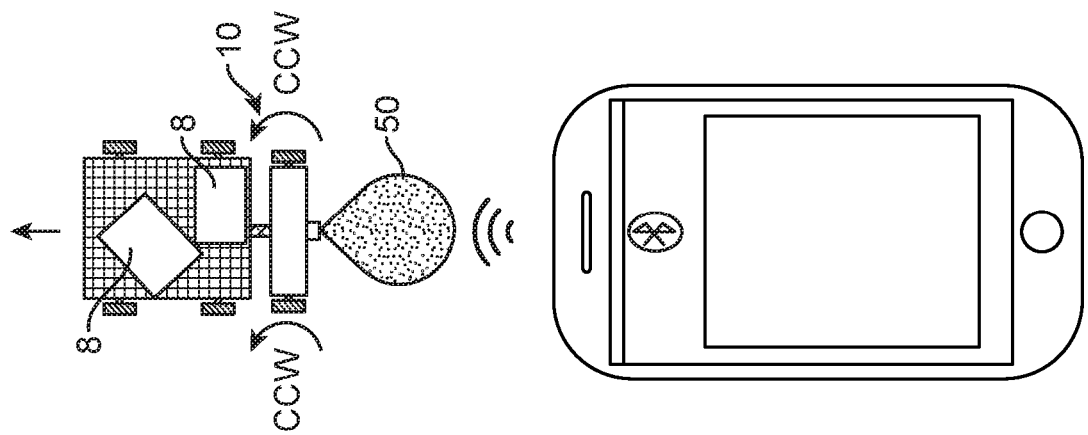
FIGS. 7A-7C illustrate an alternative control method utilizing a mobile device, in accordance with the present disclosure.
Figure 7B:
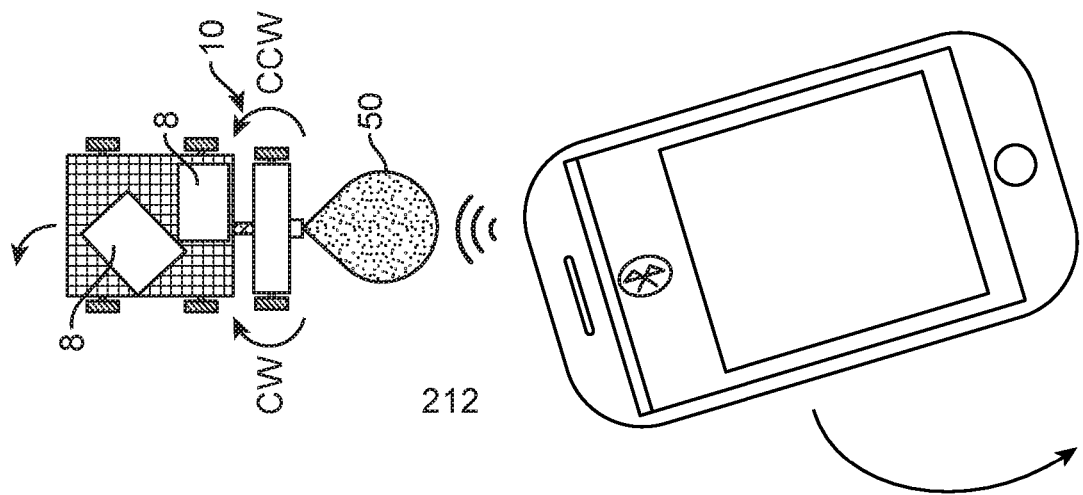
Figure 7A:
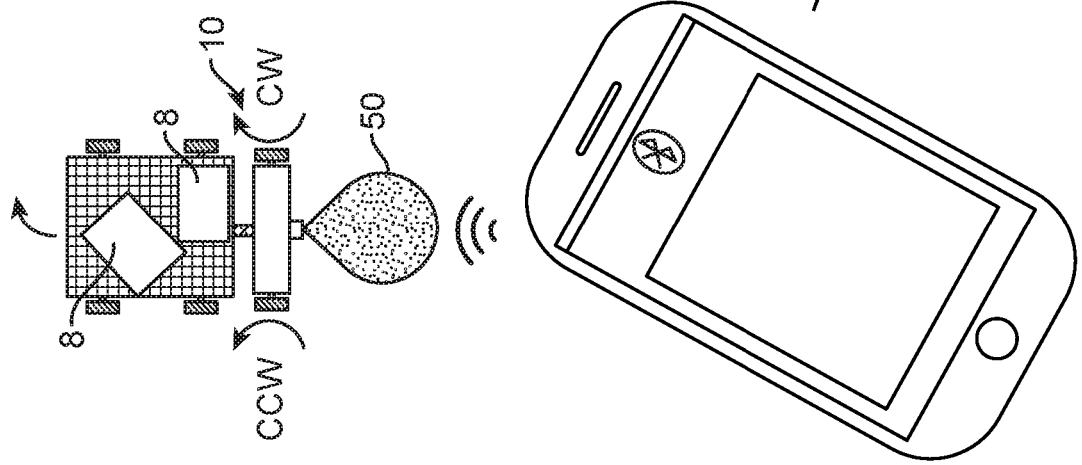

FIGS. 7A-7C illustrate an alternative control method utilizing both sensor 30 input and input from the mobile device 2 to control the device 10. As FIGS. 7A-7C show, a direction of the device 10 may be controlled manually via accelerometers and/or gyroscopes contained within the mobile device 2. For example, in one embodiment physically tilting the mobile device 2 to a right moves the device 10 to the right as shown in FIG. 7A, tilting the mobile device 2 to a left moves the device 10 to the left as shown in FIG. 7B, and holding the mobile device 2 upright or in a stationary position advances the device 10 forward as shown in FIG. 7C, all provided that one of the sensors 30 detects a user. In this way, movement of the device 10 is stopped when a user is outside of the detection zone of the sensor 30 and controlled by the mobile device 2 when the user is within the detection zone.

In various embodiments, map data of the local area proximate to the user may be utilized to guide and control the device 10 in cooperation with input from the sensors 30. The user can set final destination and navigational information through a software application. The application may be configured to calculate a route to the final destination and series of intermediate way points. The application can send step-by-step navigation commands to the machine using Bluetooth communication or other wireless transmission protocols. For example, local map data may be utilized to construct parameters of movement, i.e., clear path and obstacle populated paths. The device 10 may still navigate along the clear path based upon the inputted destination and presence of the user within the sensor zone, i.e., the device 10 only moves along the path when the user is detected within the zone. GPS data may be utilized by the device 10 to traverse the route in conjunction with sensor input of the user's presence. In one embodiment, the device 10 may be configured to be controlled and turned using navigational instructions supplied by the mobile device 2.

In various embodiments, to mitigate unintended control of the device 10 by the mobile device 2, control of the device 10 by the mobile device 2 is limited to particular positions. For example, substantially vertical position as measured and/or determined by using one or both of the accelerometer and gyroscope. In one embodiment, control of the device 10 by the mobile device 2 must be initiated by a predefined tactile input, e.g., a certain swipe characteristic, a 'shake' movement, or keyed input. In one embodiment, the mobile device 2 may control the device 10 when in 'active' mode and not a 'standby' mode of operation.

Figure 9:
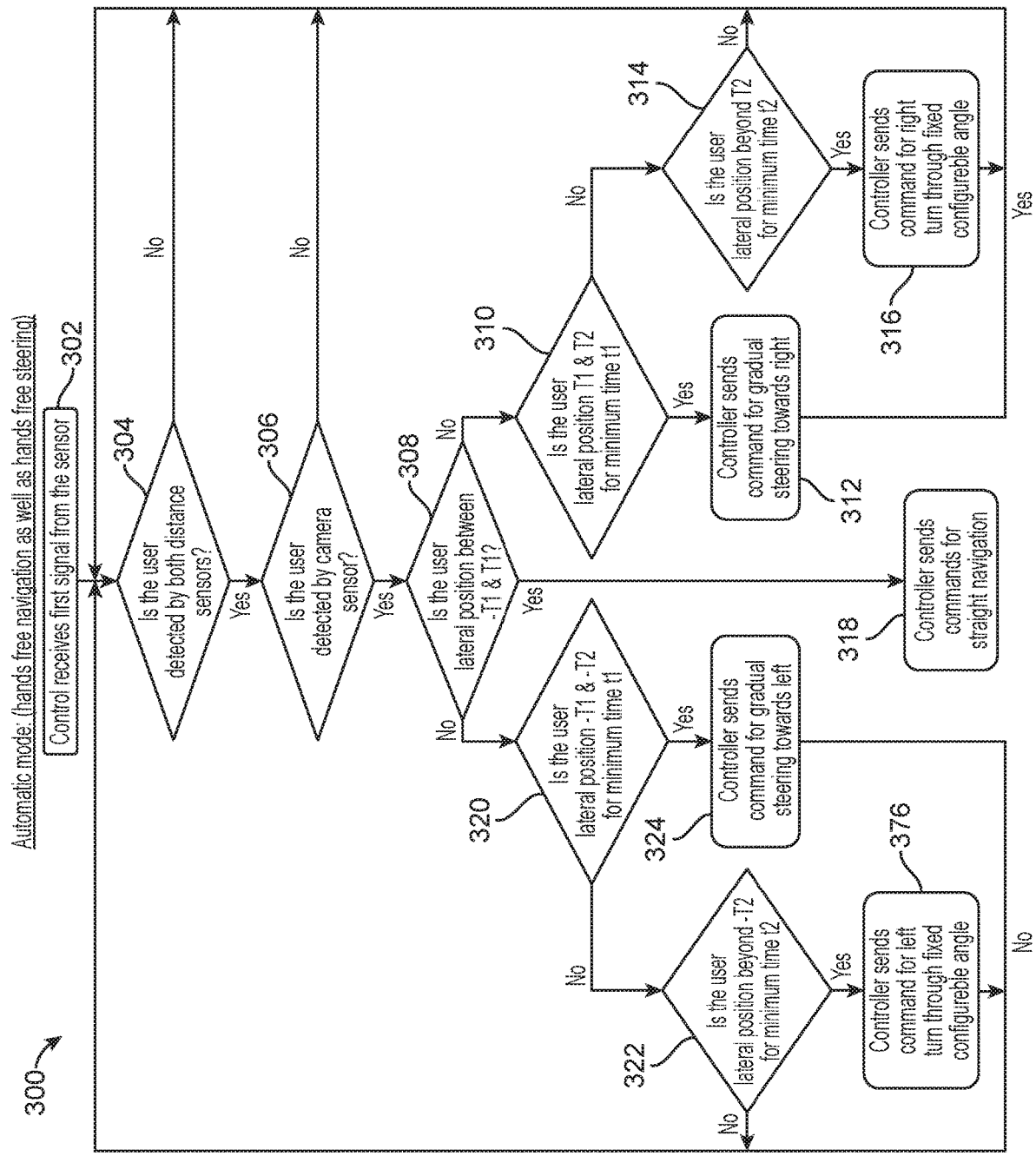
FIG. 9 shows exemplary processes that may be used to control the device, in accordance with the present disclosure.

FIG. 9 shows an exemplary process 300 that may be used to control the device 10. The process 300 may be used on a device 10 having one or more proximity sensors that include a first and second proximity sensors and a camera device 36. At block 302, the process is initiated and the controller receive signals from the proximity sensors and the camera device 36. At block 304 the controller determines whether a user is detected in the proximity sensors. If not, the process 300 loops until a user is detected. If so, the process moves to step 306 where the controller determines whether a user is present on detected imaging data. If not, the process 300 may loop back to step 302 or 304. If so, the process continues.

At step 308, the controller determines whether the user's lateral position is between −T1 and T1. If so, the controller sends commands for straight, forward motion 318. If not, the controller determines whether the user's lateral position is between −T1 and −T2 for a threshold time t1 at step 320 and whether the user's lateral position is between t1 and t2 for a threshold time t1 at step 310. If the user is detected between −T1 and −T2 for a threshold time t1 the controller sends commands for gradual course steering toward a left direction 324. If the user is not detected between −T1 and −T2 for a threshold time t1 at step 320, then the controller determines whether the user's lateral position is beyond −T2 for a minimum time t2 at step 322. If so, the controller sends a command for a left turn through a predefined fixed angle at step 376. If the user's lateral position is not beyond −T2 for a minimum time t2 at step 322 the process 300 begins again at step 302 or 304.

If, at step 310, the controller determines that the user is between T1 and T2 for a threshold time t1, then the controller executes commands to control the device 10 for a gradual right course steering 312. If not, at step 314, the controller determines whether the user's lateral position is beyond T2 for a minimum time t2. If so, the controller sends commands for executing a right turn at a predefined angle, in one embodiment. If not, the process 300 is looped back to steps 302 or 304.

A lateral position between −T1 and T1 corresponds to the user being directly, or nearly directly behind the device 10. If the lateral position of the user 6 is greater than the T1 threshold and less than the T2 position, for a predefined amount of time, the device 10 will gradually turn right to center the device 10. Similarly, if the lateral position of the user 6 is less than −T1 threshold and greater than the −T2 threshold, for a predefined amount of time, the device 10 will gradually turn to the left to center the device 10 to the user 6. Gradual turning executions are interpreted by the device 10 as changes in course rather than direction. For example, a change in course would be necessary on a curved sidewalk such as at steps 312 and 324, while a change in direction would be necessary for a 90-degree or sharper turn such as at steps 316 and 376. In one embodiment, subsequent to determining an interpretation of a change in direction, the device 10 may execute a preprogrammed direction change sequence in response to the user's approximate lateral position with respect to the threshold and time. In one embodiment, subsequent to the directional change at 316 and 376, the process 300 will loop back to 304. In this way, the device 10 will look to identify the user, again, in the lateral and longitudinal coordinates before executing further movements.

Figure 10A:
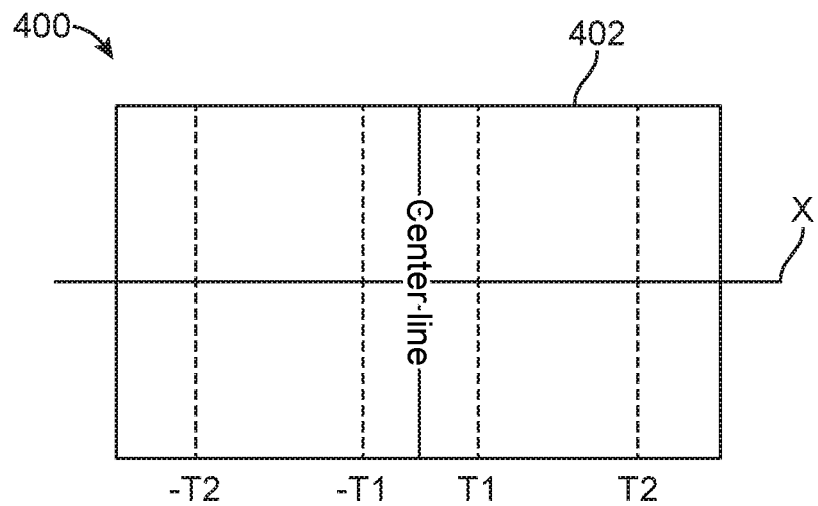
FIGS. 10A-10D show exemplary captured images with threshold overlays and human attribute recognition, in accordance with the present disclosure.
Figure 10B:
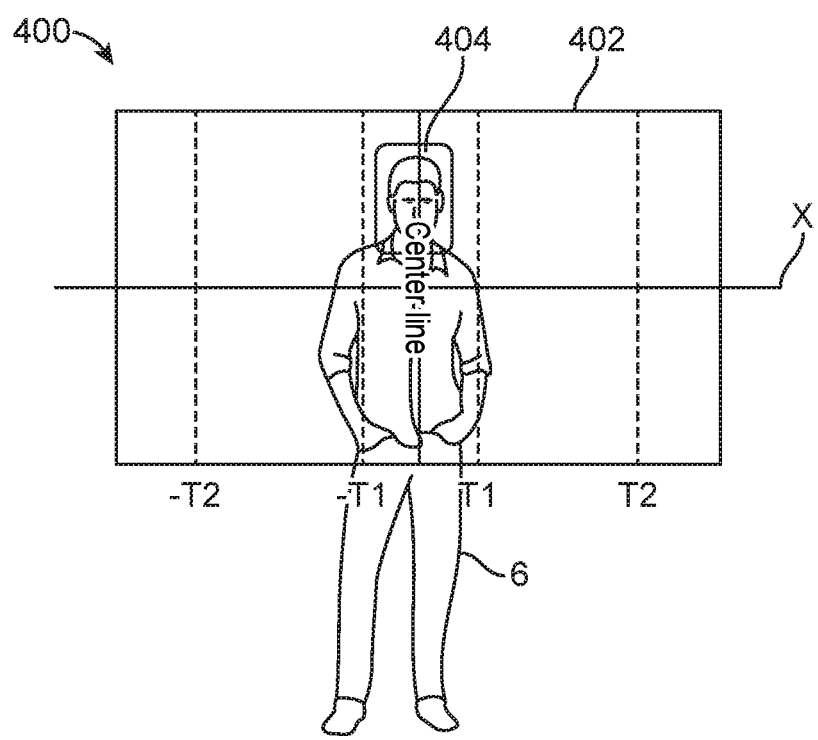
Figure 10C:
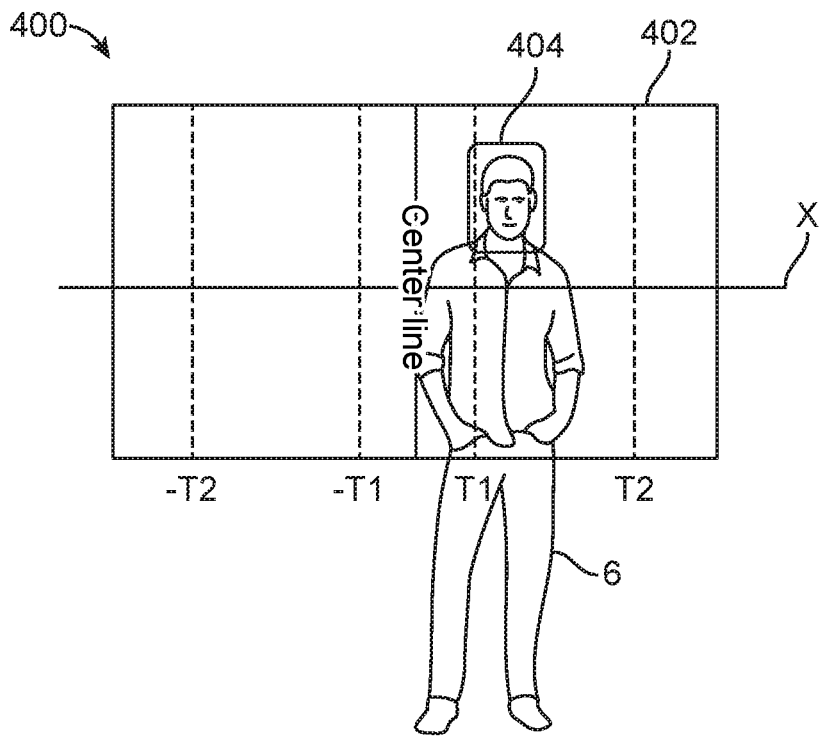
Figure 10D:
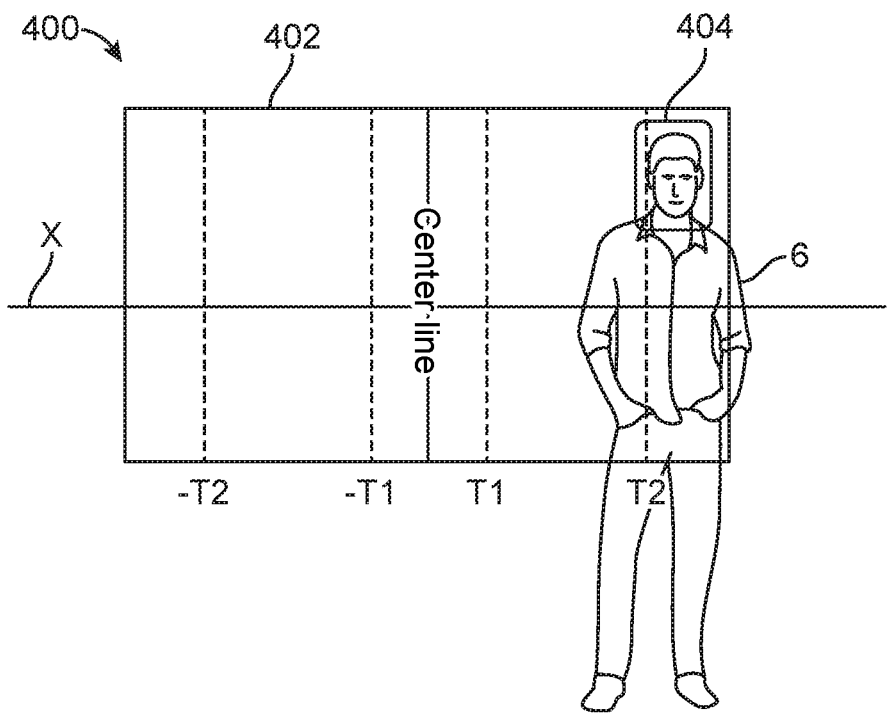

FIGS. 10A-10D illustrate exemplary camera imaging data used to approximate a user's lateral position with respect to the device 10. FIGS. 10A-10D show a series of captured images 400 each having a boundary 402. The thresholds, X axis and center line are superimposed and included for ease of description. Using facial recognition technology or other object detection techniques, a user's face or other human attribute may be identified and boxed 404 within the boundary 402. The box may be correlated to a position on axis X, e.g., by determining an average pixel position with respect to axis X. FIG. 10B shows a first captured image 400 with the user 6. As FIG. 10B shows the average position of the face is within thresholds −T1 and T1, translating to forward motion of the device 10, assuming that the user 6 is within a predefined longitudinal distance from the device 10. As FIG. 10C shows, the average position of the face is within thresholds T1 and T2, translating to a right course correction, i.e., right steering, of the device 10, assuming that the user 6 is within a predefined longitudinal distance from the device 10, and for a predefined time period t1. As FIG. 10D shows, the average position of the face is greater than T2, translating to a right direction change, i.e., right turn, of the device 10, assuming that the user 6 is within a predefined longitudinal distance from the device 10, and for a predefined time period t2.

Figure 11A:
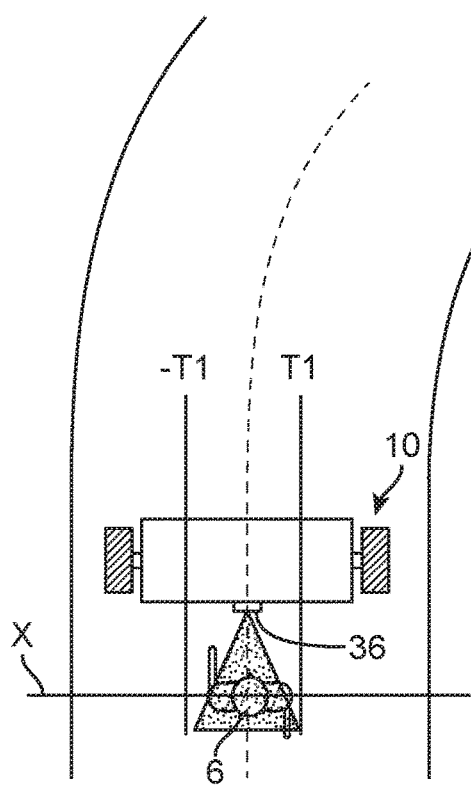
FIGS. 11A-11C illustrate exemplary control of the device using lateral information to make course corrections, in accordance with the present disclosure.
Figure 11B:
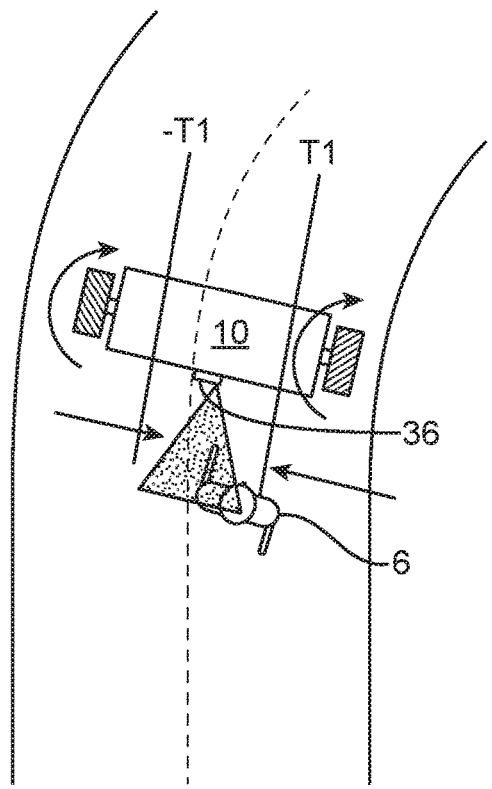
Figure 11C:
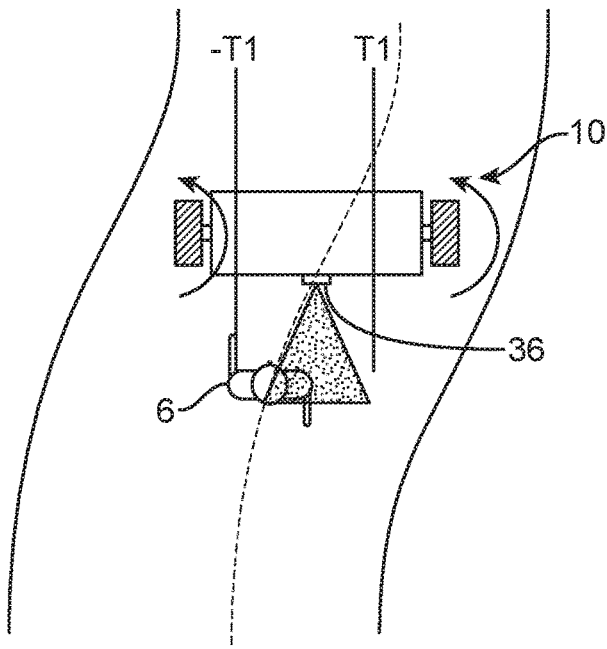

FIGS. 11A-11C illustrate exemplary control of the device 10 using lateral information to make course corrections. As shown in FIGS. 11A-11C, exemplary thresholds −T1 and T1 may be used to determine whether course corrections are necessary. In various embodiments, concurrent with course correction control, the device 10 may be evaluating whether direction changes are necessary by utilizing thresholds −T2 and T2 as described herein above and illustrated in FIGS. 12A-12C.

FIG. 11A shows a user 6 centered directly behind the device 10 between thresholds −T1 and T1. As FIG. 11A shows, the device 10 responds to the user's centered position by moving straight forward. FIG. 11B shows the user to the right of the device 10, breaching the T1 threshold. In response, the device 10 interprets the user's position as requiring a course correction of a gradual right turn. FIG. 11C shows the user to the left of the device 10, breaching the −T1 threshold. In response, the device 10 interprets the user's position as requiring a course correction of a gradual left turn.

Figure 12A:
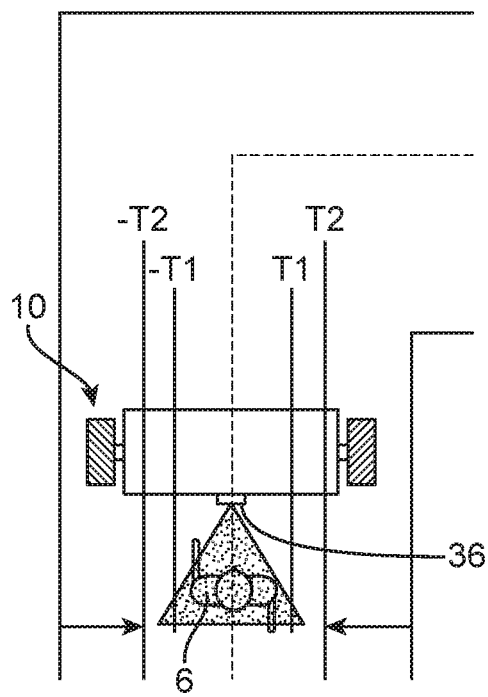
FIGS. 12A-12C illustrate exemplary control of the device using lateral information to make direction changes during operation of the device, in accordance with the present disclosure.
Figure 12B:
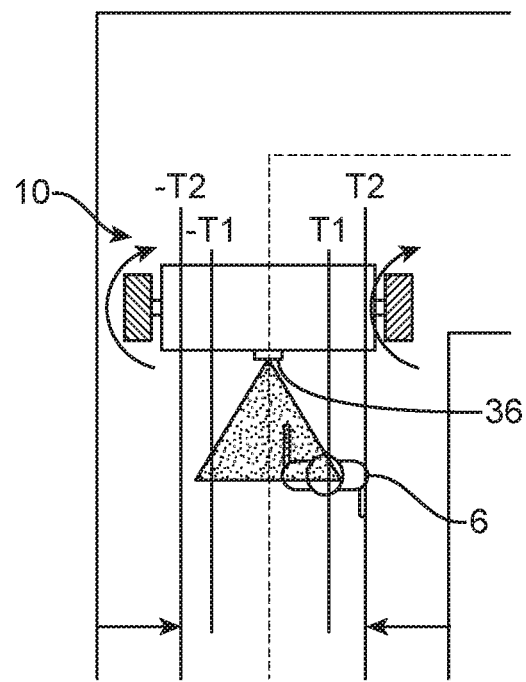
Figure 12C:
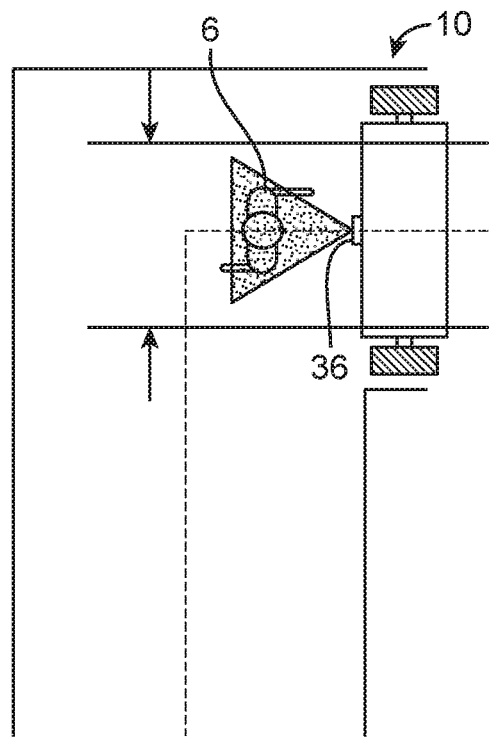

FIGS. 12A-12C illustrate exemplary control of the device 10 using lateral information to make direction changes during operation of the device 10. FIG. 12A shows a user 6 centered directly behind the device 10 between thresholds −T1 and T1 and between −T2 and T2. As FIG. 12A shows, the device 10 responds to the user's centered position by moving straight forward. FIG. 12B shows the user to the right of the device 10, beyond the T1 threshold and breaching the T2 threshold. In response, the device 10 interprets the user's position as requiring a direction change corresponding to a right turn. After executing the right turn, FIG. 12C shows the device 10 positioning itself to center the user 6 directly behind.

Figure 13:
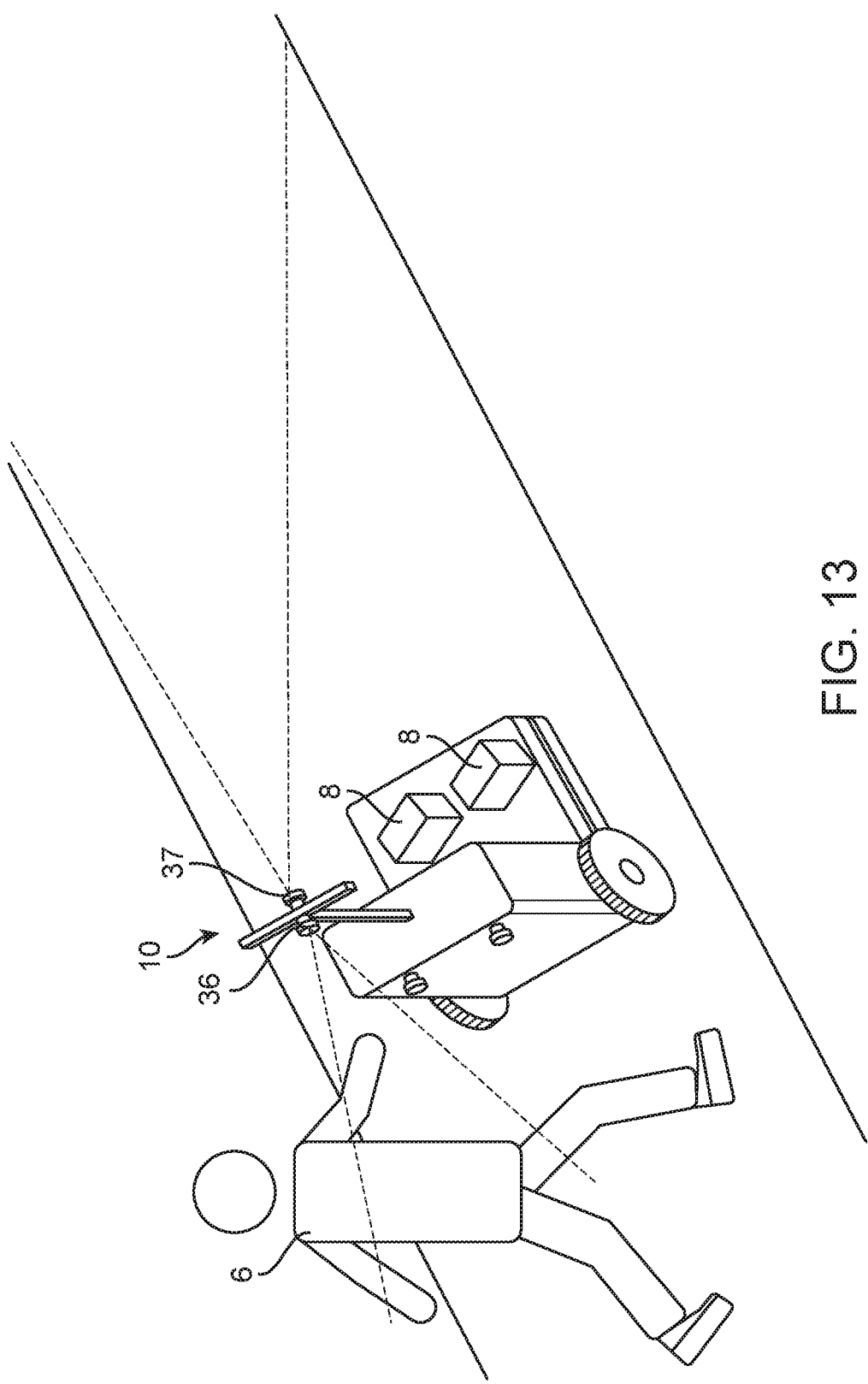
FIG. 13 shows a further embodiment of the exemplary automated load mover system, in accordance with the present disclosure.

FIG. 13 shows a further embodiment of the device 10 having a backward viewing camera 36 and an additional forward viewing camera 37. In one embodiment, the forward viewing camera 37 may be used to further control the device 10 by examining a path for edges. In this way, images from the camera 37 may be used to keep the device 10 between identified path edges using edge detection techniques as known in the art.

The disclosure has described certain preferred embodiments and modifications thereto. Further modifications and alterations may occur to others upon reading and understanding the specification. Therefore, it is intended that the disclosure not be limited to the particular embodiment(s) for carrying out this disclosure, but that the disclosure will include all embodiments falling within the scope of the appended claims.

The invention claimed is:

1. A method for controlling a vehicle using a device that can be mechanically attached to the vehicle, the method comprising:
    monitoring received input from one or more sensors oriented to detect the position of a user with respect to the vehicle when the device is mechanically attached to the vehicle;
    approximating the user's longitudinal position with respect to the vehicle based upon the monitoring;
    approximating the user's lateral position behind the vehicle based upon the monitoring; and
    controlling the device to move the vehicle based upon the approximate lateral and longitudinal positions of the user with respect to the vehicle such that the device maintains a predetermined lateral and longitudinal spatial relationship between the user and the vehicle,
    wherein the device is a two-wheeled device comprising: a first motor configured to drive a first wheel; a second motor configured to drive a second wheel; the one or more sensors; one or more processors; a memory, and a selectively attachable mechanical attachment configured to mechanically attach the device to the vehicle.

2. The method of claim 1, wherein the one or more sensors comprises a first and a second proximity sensor; and wherein the approximating the lateral position of the user is executed by:
    establishing a first zone associated with the first proximity sensor;

establishing a second zone associated with the second proximity sensor, wherein the first zone and the second zone overlap, in part; and approximating the user's lateral position based upon the user's detected presence and/or absence from the first and second zones.

3. The method of claim 2, wherein approximating the user's lateral position based upon the user's detected presence or absence from the first and second zones comprises:

approximating the user's lateral position as a right lateral position when the user is detected in the first zone and the user is not detected in the second zone;

approximating the user's lateral position as a left lateral position when the user is detected in the second zone and the user is not detected in the first zone; and approximating the user's lateral position as a center lateral position when the user is detected in the first zone and the user is detected in the second zone.

4. The method of claim 3, further comprising: controlling the device to move the vehicle forward when the user's lateral position is approximated as the center lateral position.

5. The method of claim 4, further comprising: controlling the device to stop the vehicle when the user is not detected within the first or second zones.

6. The method of claim 4, wherein the controlling the device based upon the monitored longitudinal distance comprises:

reducing speed or stopping the device when a user exceeds a predefined threshold distance from the vehicle;

maintaining speed when the user is less than the predefined threshold distance; and increasing speed when the user is within a second predefined threshold distance from the vehicle.

7. The method of claim 6, wherein the first and the second proximity sensors are acoustic-based sensors, and wherein the device further comprises an imaging device configured for further approximating the user's lateral position.

8. The method of claim 1, wherein the one or more sensors comprise a camera, and wherein a lateral position of a user is approximated by:

receiving an image from the camera;
identifying a human attribute in the image;
boxing the human attribute by defining a square boundary area that encompasses the entire human attribute;
identifying a midpoint of the square boundary; and
determining where the midpoint lies on a horizontal axis that corresponds to lateral position.

9. The method of claim 8, wherein the human attribute is a user's face.

10. The method of claim 8, further comprising:
defining a first threshold and a corresponding negative second threshold from a center position;
monitoring time the user's approximated lateral position exceeds the first threshold, if any;
monitoring time the user's approximated lateral position is less than the second threshold, if any;
controlling the device to turn the vehicle right when the user's approximated lateral position exceeds the first threshold for a predefined time period;
controlling the device to turn the vehicle left when the user's approximated lateral position is less than the second threshold for less than the predefined time period; and
controlling the device to move the vehicle forward when the user's approximated lateral position is less than the first threshold and greater than the second threshold.

11. The method of claim 10, further comprising: controlling the device to stop the vehicle when the user's approximated lateral position is NULL or not approximated.

12. The method of claim 10, wherein the controlling the device to turn the vehicle left or right is executed gradually to center the user behind the vehicle; and wherein the controlling the device to turn the vehicle left or right is ceased when the user lateral position is approximated to be centered behind the vehicle.

13. The method of claim 10, further comprising:
defining a third threshold greater than the first threshold;
defining a fourth threshold less than the second threshold;
monitoring time the user's approximated lateral position exceeds the third threshold, if any;
monitoring time the user's approximated lateral position is less than the fourth threshold, if any;
controlling the device to execute a direction change of the vehicle to a right side when the user's approximated lateral position exceeds the first and the third threshold for the predefined time period;
controlling the device to execute a direction change of the vehicle to a left side when the user's approximated lateral position is less than the second and the fourth threshold for the predefined time period.

14. The method of claim 13, wherein the direction change to the right side and the direction change to the left side are at least 90-degrees from center.

15. A two-wheeled vehicle that can be mechanically attached to a vehicle, the two-wheeled device comprising:
a first motor configured to drive a first wheel;
a second motor configured to drive a second wheel;
one or more sensors oriented to detect the position of a user with respect to the vehicle when the device is mechanically attached to the vehicle;
one or more processors;
a memory;
a selectively attachable mechanical attachment configured to mechanically attach the device to the vehicle; and
one or more programs, wherein the one or more programs are stored in the memory and configured to be executed by the one or more processors, the one or more programs including instructions for:
receiving input from the one or more sensors;
approximating the user's longitudinal position behind the vehicle based upon the received input;
approximating the user's lateral position with respect to the vehicle based on the received input; and
controlling the device to move the vehicle based upon the approximate lateral and longitudinal positions of the user with respect to the vehicle such that the device maintains a predetermined lateral and longitudinal spatial relationship between the user and the vehicle.

16. The device of claim 15, wherein the one or more sensors comprises a first and a second proximity sensor; and wherein the approximating a lateral position of the user is executed by:

establishing a first zone associated with the first sensor;
establishing a second zone associated with the second sensor, wherein the first zone and the second zone overlap, in part; and
approximating the user's lateral position based upon the user's detected presence and/or absence from the first and second zones;
wherein approximating the user's lateral position based upon the user's detected presence or absence from the first and second zones comprises:

approximating the user's lateral position as a right lateral position when the user is detected in the first zone and the user is not detected in the second zone;

approximating the user's lateral position as a left lateral position when the user is detected in the second zone and the user is not detected in the first zone;

approximating the user's lateral position as a center lateral position when the user is detected in the first zone and the user is detected in the second zone; and controlling the device to move the vehicle forward when the user's lateral position is approximated as the center lateral position.

17. The device of claim 16, wherein the one or more programs further include instructions for: controlling the first and second motors to communicate power amounts to the respective first and second wheels based upon the user's lateral position.

18. The device of claim 17, wherein the communicated power to the first wheel is correlatable to a strength of the signal received in the first zone.

19. The device of claim 15, wherein the one or more sensors comprises a camera, and wherein a lateral position of a user is approximated by:

receiving an image from the camera;
identifying a human attribute in the image;
boxing the human attribute by defining a square boundary area that encompasses the entire human attribute;
identifying a midpoint of the square boundary;
determining where the midpoint lies on a horizontal axis that corresponds to lateral position; and wherein the one or more programs further include instructions for:

defining a first threshold and a corresponding negative second threshold from a center position;

monitoring a time the user's approximated lateral position exceeds the first threshold, if any;

monitoring a time the user's approximated lateral position is less than the second threshold, if any;

controlling the device to turn the vehicle right when the user's approximated lateral position exceeds the first threshold for a predefined time period;

controlling the device to turn the vehicle left when the user's approximated lateral position is less than the second threshold for the predefined time period; and controlling the device to move the vehicle forward when the user's approximated lateral position is less than the first threshold and greater than the second threshold.

20. The vehicle of claim 19, wherein the controlling the device to turn the vehicle left or right is executed gradually to center the user behind the vehicle;

wherein the controlling the device to turn the vehicle left or right is ceased when the user's approximated lateral position is centered behind the vehicle, wherein the one or more programs further include instructions for:

defining a third threshold greater than the first threshold;
defining a fourth threshold less than the second threshold;
monitoring time a user exceeds the third threshold, if any;
monitoring time the user's position is less than the fourth threshold, if any;

controlling the device to execute a direction change of the vehicle to a right side when the user's approximated lateral position exceeds the first and the third threshold for the predefined time period;

controlling the device to execute a direction change of the vehicle to a left side when the user's approximated lateral position is less than the second and the fourth threshold for the predefined time period; and wherein the direction change to the right side and the direction change to the left side are at least 90-degrees from center.

* * * * *